United States Patent
Ahn et al.

(10) Patent No.: US 10,922,798 B2
(45) Date of Patent: Feb. 16, 2021

(54) IMAGE PROCESSING APPARATUS, METHOD FOR PROCESSING IMAGE AND COMPUTER-READABLE RECORDING MEDIUM

(71) Applicant: Samsung Electronics Co., Ltd., Suwon-si (KR)

(72) Inventors: Il-Jun Ahn, Suwon-si (KR); Ki-Heum Cho, Seoul (KR); Yong-Sup Park, Seoul (KR); Jae-Yeon Park, Seoul (KR); Hee-Seok Oh, Seoul (KR); Tammy Lee, Seoul (KR); Min-Su Cheon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 16/121,057

(22) Filed: Sep. 4, 2018

(65) Prior Publication Data

US 2019/0073757 A1    Mar. 7, 2019

(30) Foreign Application Priority Data

Sep. 1, 2017  (KR) ........................ 10-2017-0111970

(51) Int. Cl.
  *G06T 5/00* (2006.01)
  *G06K 9/00* (2006.01)
  (Continued)

(52) U.S. Cl.
  CPC .......... *G06T 5/009* (2013.01); *G06K 9/00275* (2013.01); *G06T 5/00* (2013.01);
  (Continued)

(58) Field of Classification Search
  None
  See application file for complete search history.

(56) References Cited

U.S. PATENT DOCUMENTS 10,482,574 B2 * 11/2019 Adsumilli .......... H04N 5/23238
2001/0048445 A1 * 12/2001 Ikeno .................... G09G 5/003
                                                345/589
(Continued)

FOREIGN PATENT DOCUMENTS

CN    102842115 B    11/2015
CN    106529419 A    3/2017
(Continued)

OTHER PUBLICATIONS

International search report dated Dec. 3, 2018; International application No. PCT/KR2018/010089.
(Continued)

*Primary Examiner* — Iman K Kholdebarin
(74) *Attorney, Agent, or Firm* — Jefferson IP Law, LLP

(57) ABSTRACT

An image processing apparatus is provided. The image processing apparatus according to an exemplary embodiment includes a communicator configured to receive an image, and a processor configured to generate a first image obtained by performing image processing on the received image by using a parameter for image processing, generate a second image obtained by reducing the first image at a predetermined ratio, and extract respective visual features from the first image and the second image, wherein the processor is further configured to adjust the parameter to allow a difference between the visual feature of the first image and the visual feature of the second image to be within a predetermined range.

18 Claims, 6 Drawing Sheets

(51) Int. Cl.
*G06T 5/50* (2006.01)
*G06T 7/174* (2017.01)

(52) U.S. Cl.
CPC .............. *G06T 5/50* (2013.01); *G06T 7/174* (2017.01); *G06T 2207/20081* (2013.01); *G06T 2207/30201* (2013.01)

(56) References Cited

U.S. PATENT DOCUMENTS

| | | | | |
|---|---|---|---|---|
| 2007/0146545 | A1* | 6/2007 | Iwahashi | H04N 21/4316 348/553 |
| 2009/0060388 | A1* | 3/2009 | Shingai | G06T 5/004 382/298 |
| 2009/0237686 | A1* | 9/2009 | Yoshida | H04N 1/32598 358/1.9 |
| 2010/0026722 | A1* | 2/2010 | Kondo | H04N 21/440281 345/660 |
| 2011/0091128 | A1 | 4/2011 | Jeon et al. | |
| 2011/0134135 | A1* | 6/2011 | Ota | H04N 5/208 345/581 |
| 2014/0301663 | A1* | 10/2014 | Livingston | G06T 3/40 382/298 |
| 2015/0010245 | A1 | 1/2015 | Kim | |
| 2015/0030237 | A1 | 1/2015 | Jancsary et al. | |
| 2015/0242178 | A1* | 8/2015 | Cho | G01J 3/506 345/1.2 |
| 2016/0358314 | A1 | 12/2016 | Ji et al. | |
| 2017/0024852 | A1 | 1/2017 | Oztireli et al. | |
| 2017/0140534 | A1* | 5/2017 | Chen | G06T 7/0012 |
| 2019/0012766 | A1* | 1/2019 | Yoshimi | H04N 5/3572 |
| 2019/0073757 | A1* | 3/2019 | Ahn, II | G06T 5/50 |

FOREIGN PATENT DOCUMENTS

| | | |
|---|---|---|
| EP | 2 159 753 B1 | 10/2009 |
| JP | 2013-135365 A | 7/2013 |
| JP | 5272581 B2 | 8/2013 |
| JP | 2015154334 A * | 8/2015 |
| KR | 10-2018-0045645 A | 5/2018 |

OTHER PUBLICATIONS

J. Caballero, et al., "Real-time video super-resolution with spatio-temporal networks and motion compensation," arXiv preprint arXiv:1611.05250v1, 2016.

J. Kim, K. Lee, and K. M. Lee, "Accurate image super-resolution using very deep convolutional networks," in proc. IEEE Conf. Comput. Vis. Pattern Recog., 2016, pp. 1646-1654.

C. Ledig, L. Theis, F. Huszar, J. Caballero, A. Aitken, A. Tejani, J. Totz, Z. Wang, and W. Shi, "Photo-Realistic Single Image Super-Resolution Using a Generative Adversarial Network," arXiv preprint arXiv:1609.04802, 2016.

Deep Laplacian Pyramid Networks for Fast and Accurate Super-Resolution. Published on Apr. 12, 2017.

Deep Learning for Saliency Prediction in Natural Video. Published on Apr. 28, 2016.

European Search Report dated Jul. 6, 2020; European Appln. No. 18851168.7-1210 / 3649612 PCT/KR2018010089.

* cited by examiner

FIG. 6
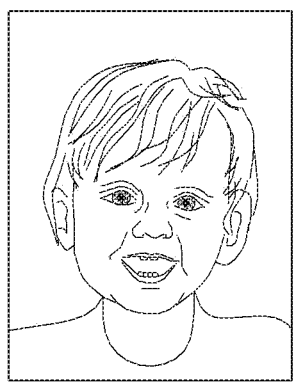 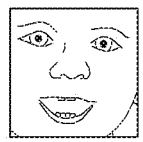    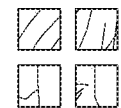
(a) (b) (c) (d)

IMAGE PROCESSING APPARATUS, METHOD FOR PROCESSING IMAGE AND COMPUTER-READABLE RECORDING MEDIUM

CROSS-REFERENCE TO RELATED APPLICATIONS

This application claims priority from Korean Patent Application No. 10-2017-0111970, filed on Sep. 1, 2017, in the Korean Intellectual Property Office, the disclosure of which is incorporated herein by reference in its entirety.

BACKGROUND

1. Field of the Invention

Devices and methods consistent with what is disclosed herein relate to an image processing apparatus, a method for processing an image and a computer readable recoding medium, and more particularly, to an image processing apparatus for generating a high-quality image, a method for processing an image and a computer-readable recording medium.

2. Description of the Related Art

Many efforts has been ongoing for improving image quality in terms of the commonly used peak signal-to-noise ratio (PSNR) and structural similarity (SSIM) in quantitative image quality evaluation. However, since image quality is affected by various elements such as human sensibility, signals, etc. there is a limitation in improving image quality from the cognitive viewpoint by using the technologies developed so far.

Recently, with the development of artificial intelligence (AI) technology, there have been increasing cases where the artificial intelligence (AI) technology is applied to image quality improvement. However, texture is expressed from a cognitive point of view such as grass, fabric, etc., but performance in a texture area having a large amount of high frequency components is still poor. Particularly, it is difficult to apply AI to a TV or a mobile terminal due to the large amount of battery consumption during an image quality improvement process. To address the problem, there is a need for an image quality improvement technique for improving similarity with a high-quality original image while minimizing computational complexity.

SUMMARY

An aspect of the exemplary embodiments relates to providing an image processing apparatus for generating a high quality image through self-transformation of an image by using machine learning, an image processing method and a computer readable recording medium.

According to an exemplary embodiment, there is provided an image processing apparatus including a communicator configured to receive an image, and a processor configured to generate a first image obtained by performing image processing on the received image by using a parameter for image processing, generate a second image obtained by reducing the first image at a predetermined ratio, and extract respective visual features from the first image and the second image, wherein the processor is further configured to adjust the parameter to allow a difference between the visual feature of the first image and the visual feature of the second image to be within a predetermined range.

The processor may be configured to adjust the parameter by using a machine learning method.

The processor may be further configured to repeatedly perform the generation of the first image, the generation of the second image, the extraction of the visual features of the first image and the second image, and the adjustment of the parameter to allow the difference between the visual feature of the first image and the visual feature of the second image to be within a predetermined range.

The processor may be further configured to adjust the parameter to allow the visual feature of the second image to be within a predetermined range of the visual feature of the first image.

The processor may be further configured to reduce the first image at a plurality of different ratios, select a reduced image having a visual feature most similar to a visual feature extracted from an image of higher quality than the received image among the plurality of reduced images, and use a ratio corresponding to the selected reduced image as the predetermined ratio.

The communicator may be further configured to receive a third image of higher quality than the received image, and wherein the processor is further configured to extract respective structural features of the first image and the third image, and adjust the parameter by using a machine learning method to allow a difference between the structural feature of the first image and the structural feature of the third image to be within a predetermined range.

The communicator may be further configured to receive a third image of higher quality than the received image, and wherein the processor is further configured to extract respective structural features of the first image and the third image, and adjust the parameter by using a machine learning method to allow a sum of a difference between the visual feature of the first image and the visual feature of the second image and a difference between the structural feature of the first image and the structural feature of the third image to be within a predetermined range.

The processor may be further configured to perform image processing on a received image by using the adjusted parameter.

The image processing apparatus may further include a display configured to display the image processed image.

The processor may be further configured to control the communicator to transmit the image processed image to an external apparatus.

According to an exemplary embodiment, there is provided a method for image processing, the method including receiving an image, and adjusting a parameter for performing image processing on the received image, wherein the adjusting includes generating a first image obtained by performing image processing on the received image by using a predetermined parameter, generating a second image obtained by reducing the first image at a predetermined ratio, extracting respective visual features of the first image and the second image, and modifying the parameter to allow a difference between the visual feature of the first image and the visual feature of the second image to be within a predetermined range.

The adjusting may include repeatedly adjusting the parameter by using a machine learning method.

The modifying may include modifying the parameter to allow the visual feature of the second image to be within a predetermined range of the visual feature of the first image.

The generating of the second image may include generating a plurality of reduced images by reducing the first image at a plurality of different ratios, selecting a reduced image having a visual feature most similar to a visual feature extracted from an image of higher quality than the received image among the plurality of reduced images, and reducing the first image at a ratio corresponding to the selected reduced image.

The method may further include receiving a third image of higher quality than the received image, wherein the adjusting includes extracting respective structural features of the first image and the third image, and modifying the parameter to allow a difference between the structural feature of the first image and the structural feature of the third image to be within a predetermined range.

The method may further include receiving a third image of higher quality than the received image, wherein the adjusting includes extracting respective structural features of the first image and the third image, and modifying the parameter to allow a sum of a difference between the visual feature of the first image and the visual feature of the second image and a difference between the visual feature of the first image and the structural feature of the third image to be within a predetermined range.

The method may further include performing image processing on the received image by using the adjusted parameter.

The method may further include displaying the image processed image.

The method may further include transmitting the image processed image to an external apparatus.

According to an exemplary embodiment, there is provided a computer readable recording medium having a program for executing an image processing method, the image processing method including receiving an image, and adjusting a parameter for performing image processing on the received image, wherein the adjusting includes generating a first image obtained by performing image processing on the received image by using a predetermined parameter, generating a second image obtained by reducing the first image at a predetermined ratio, extracting respective visual features of the first image and the second image, and modifying the parameter to allow a difference between the visual feature of the first image and the visual feature of the second image to be within a predetermined range.

BRIEF DESCRIPTION OF THE DRAWINGS

FIG. 6 is a view to explain a method for extracting a visual feature according to an embodiment of the present disclosure.

DETAILED DESCRIPTION OF EXEMPLARY EMBODIMENTS

Figure 1:
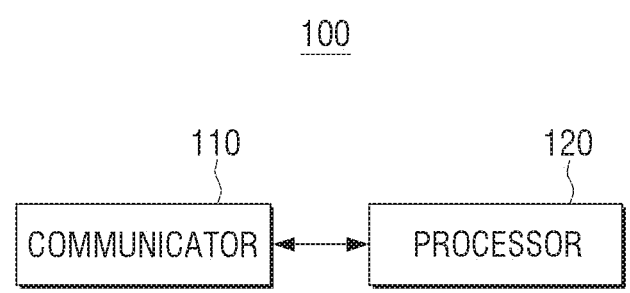
FIG. 1 is a schematic block diagram to explain configuration of an image processing apparatus according to an embodiment of the present disclosure.

The terms used in this specification will be briefly described, and the present disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The invention is not limited to an embodiment disclosed below and may be implemented in various forms and the scope of the invention is not limited to the following embodiments. In addition, all changes or modifications derived from the meaning and scope of the claims and their equivalents should be construed as being included within the scope of the present disclosure. In the following description, the configuration which is publicly known but irrelevant to the gist of the present disclosure could be omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In an exemplary embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments of the present disclosure will be described in detail with reference to the accompanying drawings so that those skilled in the art can easily carry out the present invention. However, the present disclosure may be embodied in many different forms and is not limited to the embodiments described herein. In order to clearly illustrate the present disclosure in the drawings, some of the elements that are not essential to the complete understanding of the disclosure are omitted for clarity, and like reference numerals refer to like elements throughout the specification.

Hereinafter, the present disclosure will be describe in greater detailed with reference to drawings.

FIG. 1 is a schematic block diagram to explain configuration of an image processing apparatus according to an embodiment of the present disclosure.

Referring to FIG. 1, an image processing apparatus 100 may include a communicator 110 and a processor 120. The image processing apparatus 100 may be embodied as a set-up box, server, etc. that processes an input image and transmits the processed image to an additional display apparatus. However, the present disclosure is not limited thereto, but may be embodied as a display apparatus such as a TV, a PC, a mobile device, etc., which has a display therein.

The communicator 110 may be configured to perform communication with various types of external apparatuses according to various types of communication methods. Specifically, the communicator 110 may receive a low-quality image from an external apparatus, and transmit a high-quality image generated by the processor 120 to an external apparatus such as an additional display apparatus. The communicator 110 may receive a high-quality original image corresponding to the low-quality image.

The communicator 110 may receive an image in a wired manner using, for example, an antenna, a cable, or a port, or in a wireless manner via, for example, Wi-Fi, Bluetooth, etc. In the implementation, the image processing apparatus 100 may receive an image selected by a user among a plurality of images stored in a storage (not shown) provided in the image processing apparatus 100 and process the image.

When the image processor apparatus 100 performs communication in a wireless manner, the communicator 110 may include a Wi-Fi chip, a Bluetooth chip, a wireless communication chip, and an NFC chip. To be specific, the Wi-Fi chip and the Bluetooth chip may perform communication using the WiFi method and the Bluetooth method, respectively. When the Wi-Fi chip or the Bluetooth chip is used, various connectivity information such as an SSID and a session key may be transceived, communication connection may be established based on the connectivity information, and various information may be transceived. The communication chip may refer to a chip that performs communication according to various communication standards such as IEEE, ZigBee, 3rd Generation (3G), 3rd Generation Partnership Project (3GPP), Long Term Evolution (LTE), etc. The NFC chip may refer to a chip operating in an Near Field Communication (NFC) method that uses 13.56 MHz frequency band among various RF-ID frequency bands such as 135 kHz, 13.56 MHz, 433 MHz, 860 to 960 MHz and 2.45 GHz.

The processor 120 may perform image processing on an image input through the communicator 110 by using a parameter for image processing. The image processing refers to image quality improvement processing, and the processor 120 may generate a high-quality image obtained by upscaling the input image by using the pre-stored parameter for image processing.

Upscaling refers to correcting the number of pixels increased for the purpose of realizing a high-quality image from a low-quality image, and when the sizes of the screens are the same, a clearer and more vivid image than that of the original screen may be obtained, and even when the size of the screen is increased, it is possible to obtain an image in which the image quality is not degraded than the original screen.

The processor 120 may adjust the pre-stored parameter by using the generated high-quality image. The processor 120 may extract respective visual features from the generated high quality-image and an image obtained by reducing the high-quality image at a predetermined ratio, and adjust the pre-stored parameter by using the extracted visual feature.

The visual feature may be a feature that can be perceived by a user when the user views an image with eyes. The visual feature may include not only the attributes of the image such as brightness, color, contrast, saturation, etc., but also the texture feature indicating the texture felt from the frequency form of a video signal of each area in the image, the shape and density of the edge included in the image, the arrangement of colors, etc.

The predetermined ratio may be a reduction ratio corresponding to a reduced image having a visual feature most similar to a visual feature extracted from a high-quality original image among a plurality of reduced images, which are reduced from the generated high quality image, at a plurality of different ratios. The reduction ratio may range from 0 to 1. The reduction ratio may be determined by the processor 120, or determined in advance through machine learning from an external apparatus. A method for determining a reduction ratio using the similarity will be described in detail with reference to FIG. 5.

The processor 120 may determine a reduction ratio according to the degree of deterioration of the input image. The image processing apparatus 100 may store information on a plurality of reduction ratios respectively corresponding to a plurality of deterioration degrees of the image. The information on the plurality of reduction ratios may be stored in the form of a look-up table. The processor 120 may determine a reduction ratio according to the degree of deterioration of the generated high-quality image.

The processor 120 may compare the visual features respectively extracted from the images obtained by reducing the generated high-quality image at a predetermined ratio, and modify a parameter so that the difference in the visual features may be within a predetermined range. Desirably, the processor 120 may adjust a parameter to minimize the difference in the visual features.

Visual feature being within a predetermined range means that the visual feature extracted from the generated high quality image is within a predetermined range of the visual feature extracted from the reduced image based on the visual feature extracted from the generated high quality image. However, the present disclosure is not limited thereto, but a parameter adjustment range may be determined based on various criteria.

The processor 120 may extract the respective structural features of the high-quality image generated by the pre-stored parameter and the high-quality original image input through the communicator 110, and adjust the pre-stored parameter by using the extracted structural feature. The processor 120 may modify a parameter so that the difference in the extracted structural characteristic may be in a predetermined range. Desirably, the processor 120 may adjust a parameter so that the difference in structural features may be minimized.

The structural feature may be a feature that can be obtained objectively when an image is analyzed. The structural feature may include not only the attributes of the image such as brightness, color, contrast, saturation, etc. but also the features of an image frame such as contour, edge position, thickness, sharpness, brightness around edges, color, contrast, and saturation included in an entire one frame of the image.

The processor 120 may extract the structural feature of the image frame by detecting contour through the position of the edge of the image frame based on the image signal change and detecting the width, clarity, etc. of the edge.

The processor 120 may modify a parameter so that a sum of the difference in visual features respectively extracted from the generated high-quality image and the images obtained by recuing the generated high-quality image at a predetermined ratio, and the difference in structural features respectively extracted from the generated high-quality image and the input high-quality original image may be within a predetermined range. Desirably, the processor 120 may adjust a parameter to minimize the sum of the difference in visual features and the difference in structural features.

The processor 120 may adjust a parameter by using a machine learning method. The machine learning method may be used for obtaining new information, and effectively using the obtained information, and it is technical advance that has been made to big data technology which deals with a variety of data generation amount, generation cycles, generation formats, etc. to analyze and predict data. In addition, the machine learning may include the improvement process of technology that obtains a result by repeatedly performing tasks.

The processor 120 may repeatedly adjust a parameter by using the machine learning method so that the difference between the visual feature extracted from the generated high-quality image and the image obtained by reducing the generated high-quality image may be within a predetermined range. The processor 120 may adjust a parameter by repeatedly performing a high-quality image generation operation, a generated high-quality image reduction operation, an extracting operation of respective visual features from the high quality image and the reduced image, and a modifying operation of a parameter by using the extracted visual feature.

The processor 120 may repeatedly adjust a parameter by using the machine learning method so that the difference between the structural feature extracted from the generated high-quality image and the structural feature extracted from the input high-quality original image may be within a predetermined range. The processor 120 may repeatedly adjust a parameter so that a sum of the difference in the visual features respectively extracted from the generated high quality image and the image obtained by reducing the generated high quality image at a predetermined ratio, and the difference in the structural features respectively extracted from the generated high-quality image and the input high-quality original image may be within a predetermined range.

Based on a low-quality image being input, the processor 120 may perform image processing on the input low-quality image by using the adjusted parameter.

According to various embodiments of the present disclosure, even in the case where a texture area and a non-texture area are mixed in the input image, it is possible to generate an image of much higher image quality than the related art. In addition, by using the generated high-quality image generated by using the pre-stored parameter, the present disclosure has an effect that parameter adjustment is possible within a broader range than the related art using only a high-quality original image.

Figure 2:
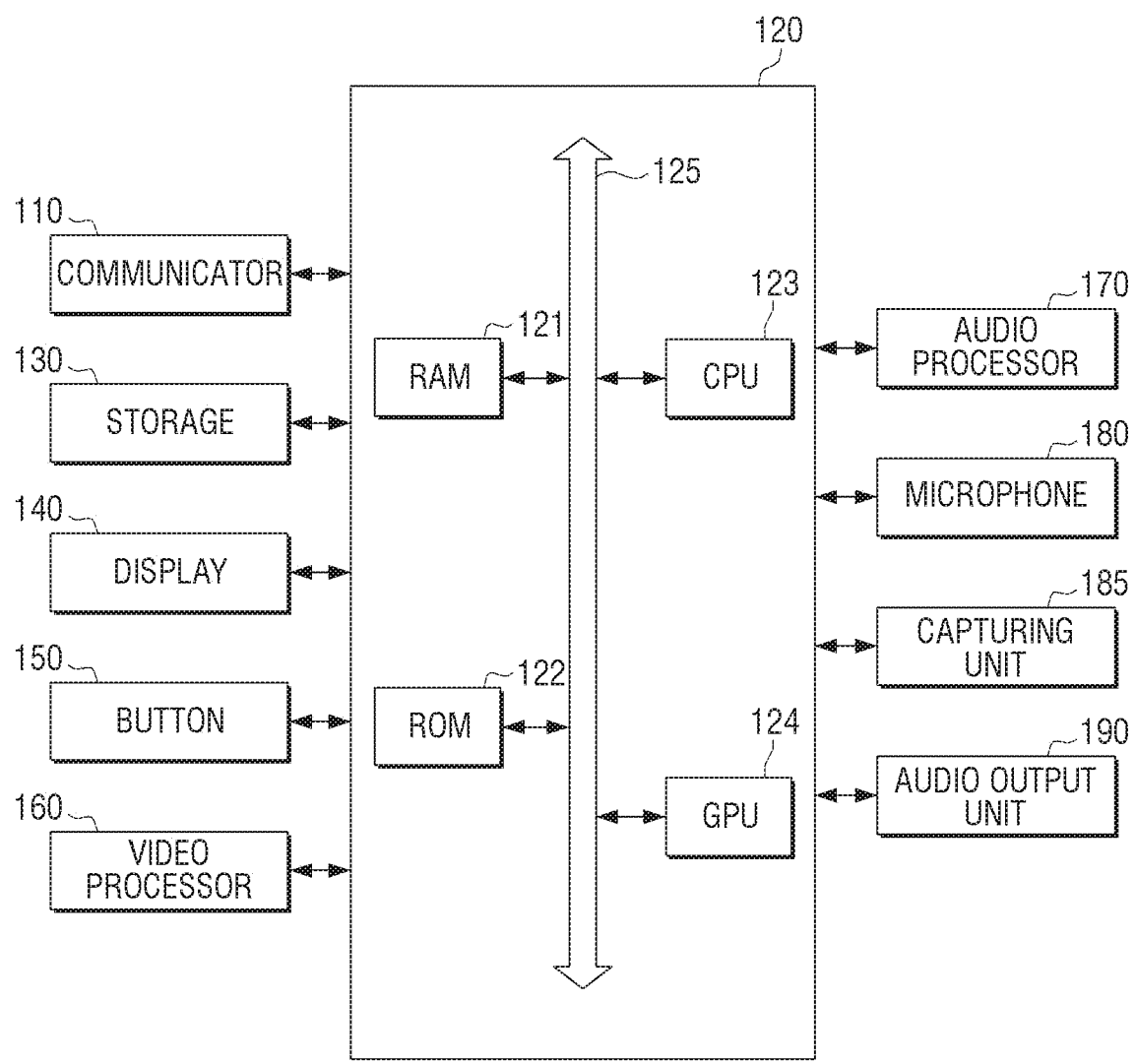
FIG. 2 is a detailed-block diagram to explain configuration of an image processing apparatus according to an embodiment of the present disclosure.

FIG. 2 is a detailed-block diagram to explain configuration of an image processing apparatus according to an embodiment of the present disclosure.

Referring to FIG. 2, an image processing apparatus 100 may include a communicator 110, a processor 120, a storage 130, a display 140, a button 150, a video processor 160, an audio processor 170, a microphone 180, a capturing unit 185, and an audio output unit 190. Since the communicator 110 and the processor 120 have been described in FIG. 1, the repetition will be omitted.

The storage 130 may store various programs and data necessary for the operation of the image processing apparatus 100. To be specific, the storage 130 may store a parameter for image processing on the input image. The stored parameter may be obtained through machine learning based on the previously input low-quality image and the high-quality image corresponding thereto.

The storage 130 may store a reduction ratio to be used for reducing the input image. The reduction ratio to be stored may be calculated by a manufacturer through machine learning, and pre-stored in the factory or renewed by periodical firmware upgrade. The storage 130 may store an algorithm for obtaining a reduction ratio.

The storage 130 may a plurality of low-quality images to be up-scaled to a high-quality image. The processor 120 may generate a high quality image out of a low-quality image selected by a user, among the stored plurality of low-quality images.

The storage 130 may store information on the reduction ratio corresponding to the degree of deterioration of the image. The reduction ratio according to the deterioration degree may be stored in the form of a look-up table.

The storage 130 may store the programs, data, etc. for upscaling a low-quality image. The processor 120 may generate a high-quality image based on the input low-quality image by using the programs and data stored in the storage 130. In some cases, a reduction ratio used in a parameter update process or an upscaling process may be determined.

The display 140 may display an image obtained by performing image processing on the input image by using the adjusted parameter. The image-processed image displayed by the display 140 may be an image generated by performing image quality improvement processing on the image input using the adjusted parameter. The display 140 may be embodied with various types of display such as a liquid crystal display (LCD), an organic light emitting diode (OLED) or a plasma display panel (PDP) or the like. The display 140 may include a driving circuit embodied in the form of a-si TFT, low temperature poly silicon (LTPS) TFT, organic TFT (OTFT), etc., a backlight unit, etc. The display 140 may be embodied as a flexible display.

The display 140 may include a touch sensor for detecting a touch gesture of a user. The touch sensor may be embodied as various types of sensors such as an electrostatic type, a pressure sensitive type, a piezoelectric type, etc. The electrostatic type of sensor may calculate a touch coordinate by detecting minute electricity excited to human body when a part of the user's body is touched to the surface of the display 140. The pressure sensitive type of sensor may calculate a touch coordinate by detecting a current which flows due to the upper and lower electrode plates of the display 140 in contact with each other when a user touches a screen. When the image processing apparatus 100 supports a pen input function, the display 140 may detect user gesture using an input means such as a pen as well as a user's finger. When the input means is a stylus pen including a coil therein, the image processing apparatus 100 may include a magnetic field sensor capable of sensing magnetic field changed by the coil in the stylus pen. Accordingly, the display 140 may detect approximate gesture, i.e. hovering as well as touch gesture.

It has been described that a display function and a gesture detection function are performed in the same configuration, but could be performed in different configurations. In addition, according to various embodiments, the image processing apparatus 100 may not be provided in the display 140.

The processor 120 may include a RAM 121, a ROM 122, a CPU 123, a Graphic Processing Unit (GPU) 124, and a bus 125. The RAM 121, the ROM 122, the CPU 123, the Graphic Processing Unit (GPU) 124, and the like may be connected to one another via the bus 125.

The CPU 123 may access the storage 130 and perform booting by using an operating system (O/S) stored in the storage 130. The CPU 123 may perform various operations by using various programs, contents, data, etc. stored in the storage 130.

A command set, etc. for system botting may be stored in the ROM 122. When a turn-on command is input and power is supplied, the CPU 123 may copy the O/S store in the storage 130 to the RAM 121 according to the command stored in the ROM 122, execute the O/S and perform system booting. When the system booting is completed, the CPU 123 may copy the various programs stored in the storage 130 to the RAM 121, execute the program copied to the RAM 121 and perform various operations.

When the booting of the image processing apparatus 100 is completed, the GPU 124 may display a UI on the display 140. To be specific, the GPU 124 may generate a screen including various objects such as icons, images, texts, etc. by using a calculation unit (not shown) and a rendering unit (not shown). The calculation unit may calculate attribute values such as coordinate values, shapes, sizes, colors, etc. of the objects according to the layout of the screen. The rendering unit may generate screens of various layouts including objects based on the attribute values calculated by the calculation unit. The screen (or a user interface window) generated by the rendering unit may be provided to the display 140 and displayed in a main display area and a sub-display area.

The button 150 may be various types of buttons such as a machine button, a touch pad, a wheel, etc. formed in an arbitrary area such as a front surface part, a side surface part, and a rear surface part, etc. of the main body of the image processing apparatus 100.

The video processor 160 may be configured to process contents received through the communicator 110, or video data included in the contents stored in the storage 130. The video processor 160 may perform various image processing such as decoding, scaling, noise filtering, frame rate conversion, resolution conversion, etc. of video data.

The audio processor 170 may be configured to process audio data included in the content received through the communicator 110 or the content stored in the storage 130. The audio processor 170 may perform various processing such as decoding, amplification, filtering, etc. of audio data.

The processor 120 may drive the video processor 160 and the audio processor 170 when a reproduction application with respect to multimedia contents is executed. The display 140 may display an image frame generated by the video processor 160 in at least one area of a main display area and a sub-display area.

The audio output unit 190 may output audio data generated by the audio processor 170.

The microphone 180 may receive a user voice or other sound and convert the user voice or other sound into data. The processor 120 may use the user voice input through the microphone 180 during a call, or convert the user voice into audio data and store the audio data in the storage 130. The microphone 180 could be defined by a stereo microphone that receives sound at a plurality of positions.

The capturing unit 185 may be configured to capture a stop image or a video image under the control of a user. The capturing unit 185 may be defined by a plurality of capturing units such as a front surface camera, a rear surface camera, etc. As described above, the capturing unit 185 may be used as a means for obtaining a user image in an embodiment for tracing user' gaze.

When the capturing unit 185 and the microphone 180 are provided, the processor 120 may perform a control operation according to a user voice input through the microphone 180 or a user motion recognized by the capturing unit 185. In other words, the image processing apparatus 100 may operate in a motion control mode or a voice control mode. In the motion control mode, the processor 120 may capture a user by activating the capturing unit 185, trace a motion change of a user, and perform a control operation corresponding thereto. In the voice control mode, the processor 120 may analyze a user voice input through the microphone 180, and operate in a voice recognition mode for performing a control operation according to the analyzed user voice.

In the image processing apparatus 100 that supports a motion control mode or a voice control mode, a voice recognition technology or a motion recognition technology may be used in various embodiments. For example, when a user makes a motion as if the user selects an object displayed on a home screen, or utters a voice command corresponding to the object, the image processing apparatus 100 may determine that the object is selected, and perform a control operation matched with the object.

Although not shown in FIG. 2, according to an embodiment, various external input ports for connecting with various external terminals such as a USB port through which a USB connector can be connected in the image processing apparatus 100, a headset, a mouse, LAN, etc., a DMB chip for receiving and processing a Digital Multimedia Broadcasting (DMB) signal, and various sensors may be further included.

Figure 3:
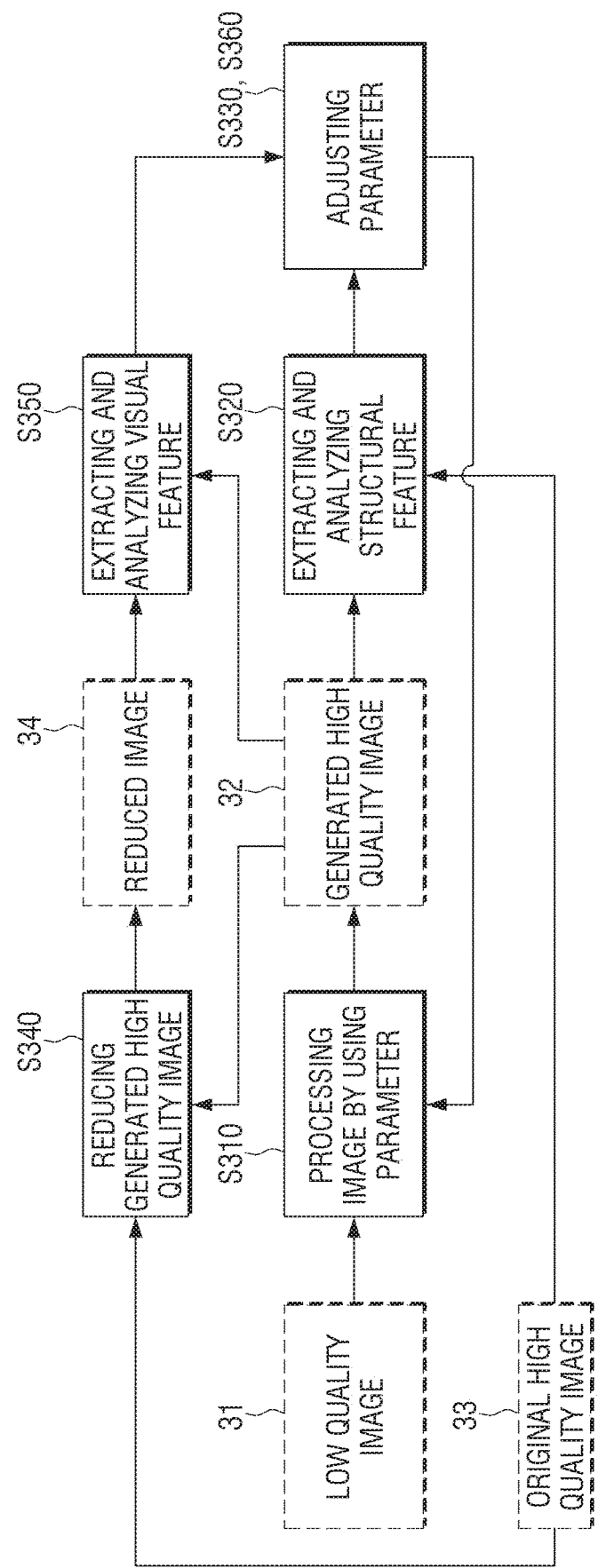
FIG. 3 is a schematic flowchart to explain an image processing method according to an embodiment of the present disclosure.

FIG. 3 is a schematic flowchart to explain an image processing method according to an embodiment of the present disclosure.

Referring to FIG. 3, an image processing apparatus may receive a low-quality image 31. The image processing apparatus may receive an original high quality image 33 of higher quality than a low-quality image 31. The low-quality image 31 may be an image where the image quality of the original high quality image 33 is degraded. In addition, the image processing apparatus may perform image processing on the received low-quality image 31 with the pre-stored parameter at step S310. The pre-stored parameter may be a parameter for image processing, and it could be machine learned in advance.

The image processing apparatus may extract the respective structural features of the high-quality image 32 generated by image processing and the input original high-quality image 33, and analyze the extracted structural features at step S320.

The image processing apparatus may adjust a parameter so that the structural feature of the generated high-quality image 32 and the structural feature of the original high-quality image 33 may be within a predetermined range at step S330. The structural feature being within a predetermined range means that the structural feature of the generated high-quality image 32 is within a predetermined range of the structural feature of the original high-quality image 33.

The image processing apparatus may adjust a parameter by using the visual feature of an image. To be specific, the image processing apparatus may reduce the high-quality image 32 generated by using the input original high-quality image 33 at a predetermined ratio. The predetermined ratio may be a reduction ratio corresponding to an image of which extract visual feature is similar to the visual feature extracted from the original high-quality image 33 among the plurality of reduced images, which are reduced from the generated high-quality image 32, at a plurality of different reduction ratios.

The image processing apparatus may extract the respective visual features from the reduced image 34 generated by reducing the generated high-quality image 32 at a predetermined ratio and the generated high-quality image 32, and analyze the extracted visual feature at step S350.

The image processing apparatus may adjust a parameter so that the difference between the visual feature of the reduced image 34 and the visual feature of the generated high-quality image 32 may be within a predetermined range at step S360. The difference in visual features being within a predetermined range means that the visual feature of the generated-high quality image 32 based on the reduced image is within a predetermined range of the visual feature of the reduced image 34. A method for extracting visual characteristic and modifying a parameter from the extracted visual feature will be described in detail with reference to FIG. 4.

For convenience of explanation, it has been illustrated and described that parameter adjustment according to visual feature analysis is performed after parameter adjustment according to structural feature analysis is performed. However, the order is not fixed, but the parameter adjustment may be simultaneously performed. In addition, as described above, parameter adjustment can be performed independently according to feature analysis. In the implementation, a parameter may be adjusted in consideration of both the visual feature analysis and the structural feature analysis. To be specific, an image processing apparatus may adjust a parameter so that a sum of the difference in visual features and the difference in structural features may be minimized.

According to various embodiments of the present disclosure, an image of much higher-quality compared to the related art may be generated even when a texture area and a non-texture area are mixed in the input image. In addition, by using a high-quality image generated by using the pre-stored parameter, the present disclosure has an effect that parameter adjustment is possible within a broader range than the related art using only the high-quality original image.

Figure 4:
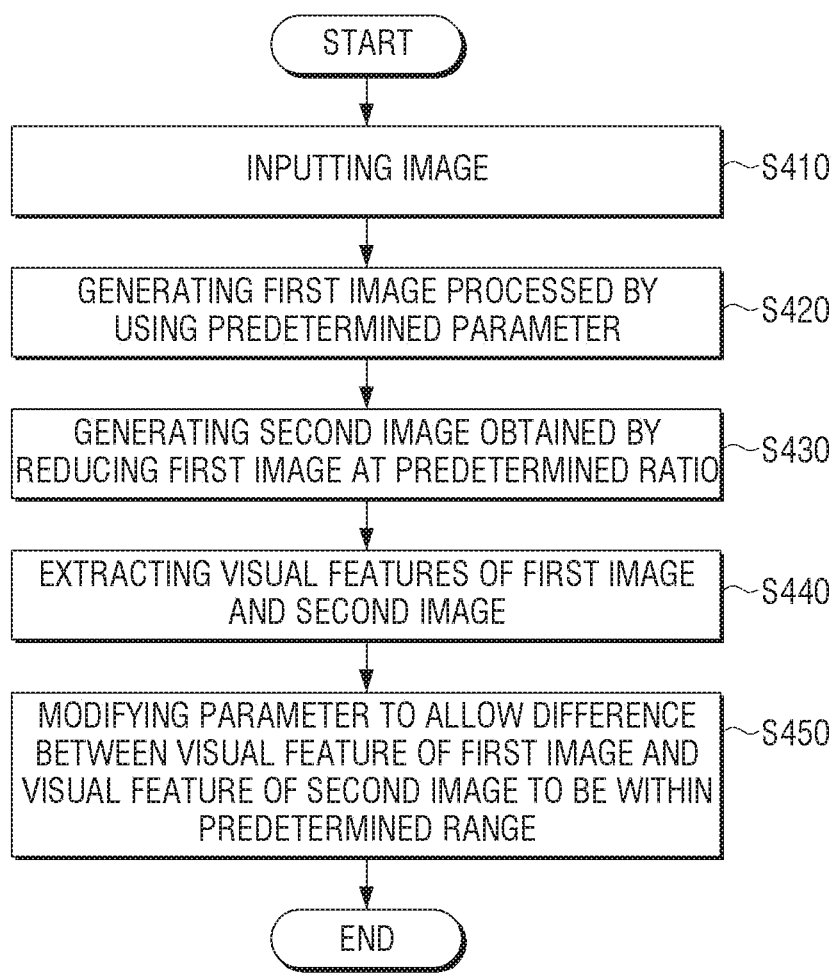
FIG. 4 is a flowchart to explain a parameter modification process using a visual feature of the image processing method illustrated in FIG. 3 according to an embodiment of the present disclosure.

FIG. 4 is a flowchart to explain a parameter modification process using a visual feature of the image processing method illustrated in FIG. 3 according to an embodiment of the present disclosure.

Referring to FIG. 4, an image processing apparatus may receive an image at step 410. To be specific, an image processing apparatus may receive an image from an external apparatus, and the received image may be a low-quality image. The image processing apparatus may receive a high-quality original image corresponding to a low-quality image, and the low-quality image may be a degraded image of the high-quality original image. The image processing apparatus may receive any one of the plurality of images stored in a storage.

The image processing apparatus may generate a first image subjected to the image processing by using a predetermined parameter at step S420. The predetermined parameter may be a parameter pre-stored in the storage, or a parameter for improving the image quality of an image. The predetermined parameter may be machine leaned by improving the image quality of the plurality of received images. The first image subjected to the image processing by using the predetermined parameter may be a high-quality image having the improved image quality than the input image.

The image processing apparatus may generate a second image obtained by reducing the generated first image at a predetermined ratio at step S430. To be specific, the predetermined ratio may be a ratio corresponding to a reduced image having the most similar visual feature to the visual feature of the input high-quality original image among a plurality of reduced images obtained by reducing the first image at a plurality of different reduction ratios. However, the present disclosure is not limited thereto, but the predetermined ratio may be selected from the plurality of reduction ratios according to the degree of image quality deterioration of the input low-quality image or the first image.

The image processing apparatus may extract the respective visual features of the first image and the second image at step S440. To be specific, the image processing apparatus may extract the respective visual features of the first and second images by using a multi-layer method, and calculate the feature maps of various sizes for each of the plurality of extracted visual features. The feature map of the second image, which is the reduced image, may be calculated in the arrangement of the plurality of second images to correspond to the size of the feature map of the first image to coincide with the size of the feature map of the first image. For example, when the second image is generated by reducing the first image by 0.5 times, and the image processing apparatus may arrange the second images in the arrangement of 2×2, and calculate the feature map of the visual feature of the image in the arrangement.

A layer may be related to the size of an image, and as a layer index increases, the size of an entire image may be reduced. For example, when the layer index is small, the feature map for the small part in the image may be calculated, and the layer index is large, the feature map for the larger part may be calculated. An example embodiment for various layers will be described with reference to FIG. 6.

A gram matrix for measuring a correlation between feature maps on each layer may be calculated based on the calculated feature map.

In order for the visual feature extracted from the first image, which is a high quality image generated by the pre-stored parameter, to be similar to the visual feature of the second image obtained by reducing the first image, the gram matrixes obtained from respective layers should be similar, the image processing apparatus may obtain the difference in gram matrixes between the visual feature of the first image and the visual feature of the second image.

A gram matrix ($G_{z,ij}^{l}$) may be calculated as below by using a visual feature ($F^l$) of the image obtained from each layer.

Where z is the input image, l is the layer index, i and j are the indexer of the visual feature, and k is the index of the pixel of the visual feature. A difference ($C_{style}$) in the gram matrixes may be calculated as follow by giving a weight $\omega_{Cstyle}$ to each layer.

$$E_{l,style} = \sum_{i,j}(G_{x^n,ij}^{l} - G_{s^n,ij}^{l})^2$$

$$C_{style} = \sum_{l=0}^{L}\omega_{l,style}E_{l,style}$$

Where x is the first image and s is the second image.

The image processing apparatus may calculate a difference ($C_{content}$) between the pixel values respectively corresponding to the visual features of the first image and the second image.

$$E_{l,content} = \sum_{i,j}(F^l_{x^n,ij} - F^l_{y^n,ij})^2$$

$$C^n_{content} = \sum_{l=0}^{L} \omega_{l,content} E_{l,content}$$

The image processing apparatus may modify the pre-stored parameter so that the difference between the visual feature of the first image and the visual feature of the second image may be within a predetermined range at step S450.

In the embodiment, a parameter most suitable for generating a high-quality image most similar to an original image may be obtained through machine leaning that repeatedly performs the above processes.

The processes of extracting the visual feature and modifying the parameter may be applied in the same order to the process of modifying a parameter using the structural feature. The image processing apparatus may calculate the difference between the pixel values respectively corresponding to the feature map which extracts the structural feature of the generated high-quality image and the feature map which extracts the structural feature of the original high-quality image so that the difference may be within a predetermined range.

It should be understood that a parameter can be modified by using both the visual feature and the structural feature. The image processing apparatus may calculate a sum of the difference of the gram matrixes respectively corresponding to the visual characteristic of the first image and the visual characteristic of the second image, and the difference in pixel values respectively corresponding to the feature map of the structural feature of the generated high-quality image and the feature map of the structural feature of the original high-quality image, and modify a parameter so that a sum of the differences C may be within a predetermined range.

$$C = C_{styel} + C_{content}$$

According to various embodiments of the present disclosure, an image of much higher image quality may be generated than a related art even in the case where the texture area and the non-texture area are mixed in the input image. In addition, by using a high-quality image generated by using the pre-stored parameter, a parameter may be adjusted within a broader range than the related art which uses only the high quality original image.

Figure 5:
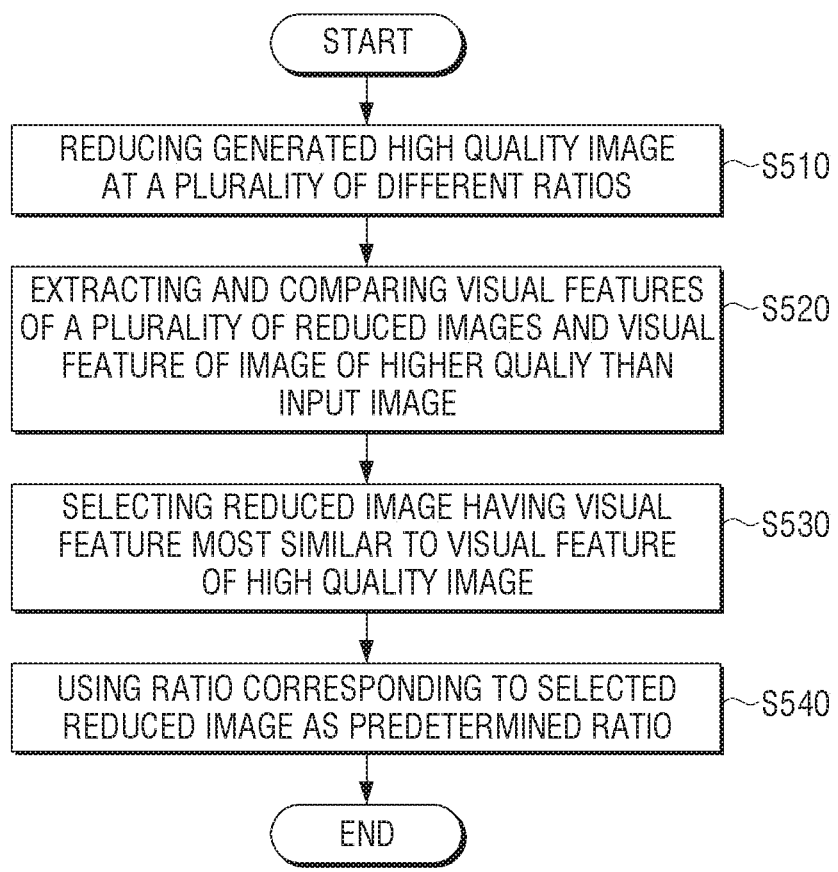
FIG. 5 is a flowchart illustrating a reduction ratio determination method according to an embodiment of the present disclosure.

FIG. 5 is a flowchart illustrating a reduction ratio determination method according to an embodiment of the present disclosure.

Referring to FIG. 5, an image processing apparatus may reduce the generated high-quality image at a plurality of different ratios at step S510. For example, the image processing apparatus may generate 5 (five) reduced images obtained by reducing the generated high-quality image by using 5 (five) reduction ratios such as 0.1, 0.3, 0.5, 0.7 and 0.9.

The image processing apparatus may extract and compare the visual features of the plurality of reduced images and the visual feature of the image of higher quality than the input image at step S520. The image of higher quality than the input image may be a high-quality original image corresponding to a low-quality input image.

The image processing apparatus may arrange a plurality of reduced images, which are reduced at respective reduction ratios, to correspond to the size of the input image, and extract the visual feature from each image in the arrangement. For example, the image processing apparatus may arrange the plurality of reduced images which are reduced by a scale factor of 0.1 into a size corresponding to the input image, and extract the visual feature from the image in the arrangement. In the similar manner, the image processing apparatus may extract the respective visual features for the scale factors of 0.3, 0.5, 0.7 and 0.9. Meanwhile, in the embodiment, the scale factor is not limited to the values described in the above-examples, and the number of scale factors may be smaller than or equal to 4 (four), or greater than or equal to 6 (six).

The image processing apparatus may compare a plurality of visual features respectively extracted from a plurality of reduced images with the visual feature of a high-quality original image. To be specific, the image processing apparatus may calculate the feature maps of various sizes with respect to the visual feature of the high-quality original image and the plurality of visual features respectively extracted from the plurality of reduced images by using a multi-layer method. The layer may relate to the size of an image, and as the layer index increases, the size of an entire image may be reduced. For example, when the layer index is small, the feature map for a small part in the image may be calculated, and when the layer index is large, the feature map for the larger part may be calculated.

The gram matrix for measuring a correlation between the feature maps on each layer may be calculated based on the calculated feature map.

In order for the visual feature extracted from the reduced image to be similar to the visual feature of the high-quality original image, the gram matrixes obtained from respective layers should be similar, the image processing apparatus may calculate the difference between the gram matrixes of the visual feature of the high-quality original image and the visual feature extracted from the reduced image on each layer.

The image processing apparatus may calculate the average of the differences between the gram matrixes of the visual feature of the high-quality original image and the visual feature extracted from the reduced image.

The image processing apparatus may select the reduced image having a visual feature most similar to the visual feature of the high-quality original image among a plurality of visual features respectively extracted from a plurality of reduced images at step S530. The visual feature having the highest similarity means that the average of the differences in gram matrix is minimized. In other words, the image processing apparatus may select the reduced image having the visual feature of the high-quality original image and the visual feature where the average of the differences in gram matrixes is minimized, among the plurality of reduced images which are reduced at a plurality of reduction ratios.

The image processing apparatus may use a ratio corresponding to the selected reduced image as a predetermined ratio at step S540.

As described above, a reduction ratio corresponding to the reduced image having the most similar visual feature to the high-quality original image is determined by using the feature map, but in the implementation, the reduction ratio may be determined according to the degree of deterioration of the input low-quality image.

To be specific, the degree of deterioration of image quality of the input image may be determined based on the image quality improvement rate of the generated high-quality image of higher quality than the input low-quality image, and according to the degree of deterioration of image quality, the reduction ratio corresponding thereto may be determined. In this case, the degree of deterioration of image quality and the reduction ratio may be pre-stored in the form of a look-up table.

As described above, compared to the related art using a pre-determined reduction ratio in an external apparatus, etc. the present disclosure determines a reduction ratio for each input image, and processes an image to be more similar to an original image.

FIG. 6 is a view to explain a method for extracting visual feature of the input image by using a multi-layer method. To be specific, FIG. 6 is a view to explain a method for extracting characteristic feature of the input image by using a multi-layer method.

Referring to FIG. 6, when the image shown in FIG. 6(A) is input to an image processing apparatus, the image processing apparatus may calculate feature maps at different levels. Specifically, the image processing apparatus may calculate the feature map from a high level to a lower level as shown in FIGS. 6(B) to 6(D). For convenience of explanation, the feature map from the high level to the low level has been illustrated, but in the implementation, the feature map may be calculated from the low level to the high level.

The lowering of the level means that the size of an entire image is increased. For example, at the lower level, the feature map for a small part in the image may be calculated, and at the high level, the feature map for a larger part in the image may be calculated. In other words, from the high level to the low level, the range in which the visual feature is extracted in the input image may be narrowed, but the visual feature may be extracted by enlarging the small range, so that detailed features may be extracted.

FIG. 6(B) illustrates a feature map at the high level. Referring to FIG. 6(B), the feature map for the entire face, which is the largest part in the input image of FIGS. 6(B) to 6(D), may be calculated.

FIG. 6(C) illustrates a feature map at the lower level. Referring to FIG. 6(C), the feature map calculated in the input image may be for eye, noise, and mouth of the face, which is in a smaller range than the feature map for the entire face of FIG. 6(B), and the size of an entire image including the feature map of FIG. 6(C) may be greater than that of an entire image of FIG. 6(B).

FIG. 6(D) illustrates a feature map at the lowest level. Referring to FIG. 6(D), the feature map calculated in the input image may be the part of eye, noise and mouth, which is in a smaller range than the feature map for each part, and the size of an entire image including the feature map of FIG. 6(D) may be the greatest among those of FIG. 6(B) to 6(D).

According to various embodiment as described above, the present disclosure can generate an image of high image quality than the related art even in the case where a texture area and a non-texture area are mixed in the input area. In addition, by using the image of high quality by using the pre-stored parameter, it is possible to adjust a parameter in a broader range than the related art using the original high quality image.

The various embodiments described above may also be embodied in a recording medium readable by a computer or a similar device using software, hardware, or a combination thereof. In accordance with a hardware implementation, the embodiments described in the present disclosure may be embodied using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions. In some cases, embodiments described herein may be implemented by the processor 120 itself. In the implementation by hardware, embodiments such as the procedures and functions described herein may be implemented in separate software modules. Each of the software modules may perform one or more of the functions and operations described herein.

Meanwhile, an image processing method according to various embodiments of the present disclosure could be stored in a non-transitory readable medium. Such non-transitory readable medium could be used in various devices.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although exemplary embodiments have been shown and described, it will be appreciated by those skilled in the art that changes may be made to these exemplary embodiments without departing from the principles and spirit of the present disclosure. Accordingly, the scope of the present invention is not construed as being limited to the described exemplary embodiments, but is defined by the appended claims as well as equivalents thereto.

What is claimed is:

1. An image processing apparatus, comprising:
   a communicator configured to receive a low-quality image of lower quality than an original image and the original image; and
   a processor configured to:
   generate a first image of higher quality than the low-quality image obtained by performing image processing on the received low-quality image by using a parameter for image processing,
   generate a plurality of reduced images to reduce the first image at a plurality of different ratios,
   extract respective visual features from the original image and the plurality of reduced images, and
   select a second image which is a reduced image having a visual feature most similar to a visual feature extracted from the original image among the plurality of reduced images,
   wherein the processor is further configured to adjust the parameter to allow a difference between the visual feature of the first image and the visual feature of the second image to be within a first predetermined range.

2. The image processing apparatus as claimed in claim 1, wherein the processor is configured to adjust the parameter by using a machine learning method.

3. The image processing apparatus as claimed in claim 1, wherein the processor is further configured to repeatedly perform the generation of the first image, the generation of the second image, the extraction of the visual features of the original image and the second image, and the adjustment of the parameter to allow the difference between the visual feature of the first image and the visual feature of the second image to be within the first predetermined range.

4. The image processing apparatus as claimed in claim 1, wherein the processor is further configured to adjust the parameter to allow the visual feature of the second image to be within the first predetermined range of the visual feature of the first image.

5. The image processing apparatus as claimed in claim 1, wherein the processor is further configured to:
   extract respective structural features of the first image and the original image, and
   adjust the parameter by using a machine learning method to allow a difference between the structural feature of the first image and the structural feature of the original image to be within a second predetermined range.

6. The image processing apparatus as claimed in claim 1, wherein the processor is further configured to:
   extract respective structural features of the first image and the original image, and
   adjust the parameter by using a machine learning method to allow a sum of a difference between the visual feature of the first image and the visual feature of the second image and a difference between the structural feature of the first image and the structural feature of the original image to be within a third predetermined range.

7. The image processing apparatus as claimed in claim 1, wherein the processor is further configured to perform image processing on a received image by using the adjusted parameter.

8. The image processing apparatus as claimed in claim 7, further comprising:
   a display configured to display the image processed image.

9. The image processing apparatus as claimed in claim 7, wherein the processor is further configured to control the communicator to transmit the image processed image to an external apparatus.

10. A method for image processing, the method comprising:
    receiving a low-quality image of lower quality than an original image and the original image; and
    adjusting a parameter for performing image processing on the received image,
    wherein the adjusting comprises:
       generating a first image of higher quality than the low-quality image obtained by performing image processing on the received low-quality image by using a predetermined parameter,
       generating a plurality of reduced images to reduce the first image at a plurality of different ratios,
       extracting respective visual features from the original image and the plurality of reduced images,
       selecting a second image which is a reduced image having a visual feature most similar to a visual feature extracted from the original image among the plurality of reduced images, and
       modifying the parameter to allow a difference between the visual feature of the first image and the visual feature of the second image to be within a first predetermined range.

11. The method as claimed in claim 10, wherein the adjusting comprises repeatedly adjusting the parameter by using a machine learning method.

12. The method as claimed in claim 10, wherein the modifying comprises modifying the parameter to allow the visual feature of the second image to be within the first predetermined range of the visual feature of the first image.

13. The method as claimed in claim 10,
    wherein the adjusting comprises:
    extracting respective structural features of the first image and the original image, and
    modifying the parameter to allow a difference between the structural feature of the first image and the structural feature of the original image to be within a second predetermined range.

14. The method as claimed in claim 10,
    wherein the adjusting comprises:
    extracting respective structural features of the first image and the original image, and
    modifying the parameter to allow a sum of a difference between the visual feature of the first image and the visual feature of the second image and a difference between the visual feature of the first image and the structural feature of the original image to be within a third predetermined range.

15. The method as claimed in claim 10, further comprising:
    performing image processing on the received image by using the adjusted parameter.

16. The method as claimed in claim 15, further comprising:
    displaying the image processed image.

17. The method as claimed in claim 15, further comprising:
    transmitting the image processed image to an external apparatus.

18. A computer readable recording medium having a program for executing an image processing method, the image processing method comprising:
    receiving a low-quality image of lower quality than an original image and the original image; and
    adjusting a parameter for performing image processing on the received image,
    wherein the adjusting comprises:
       generating a first image of higher quality than the low-quality image obtained by performing image processing on the received low-quality image by using a predetermined parameter,
       generating a plurality of reduced images to reduce the first image at a plurality of different ratios,
       extracting respective visual features from the original image and the plurality of reduced images,
       selecting a second image which is a reduced image having a visual feature most similar to a visual feature extracted from the original image among the plurality of reduced images, and
       modifying the parameter to allow a difference between the visual feature of the first image and the visual feature of the second image to be within a first predetermined range.

* * * * *